United States Patent Office 2,866,365
Patented Dec. 30, 1958

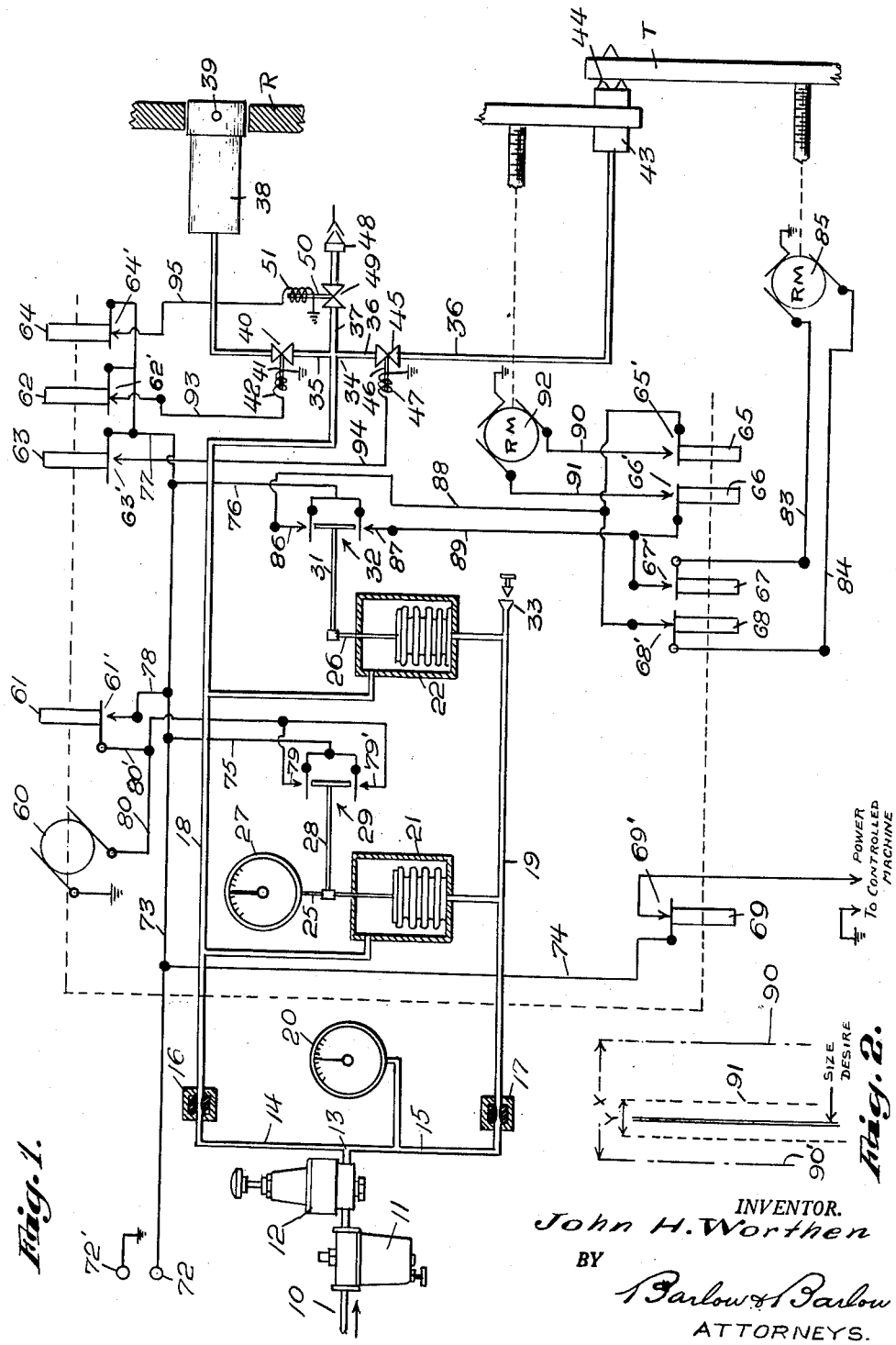

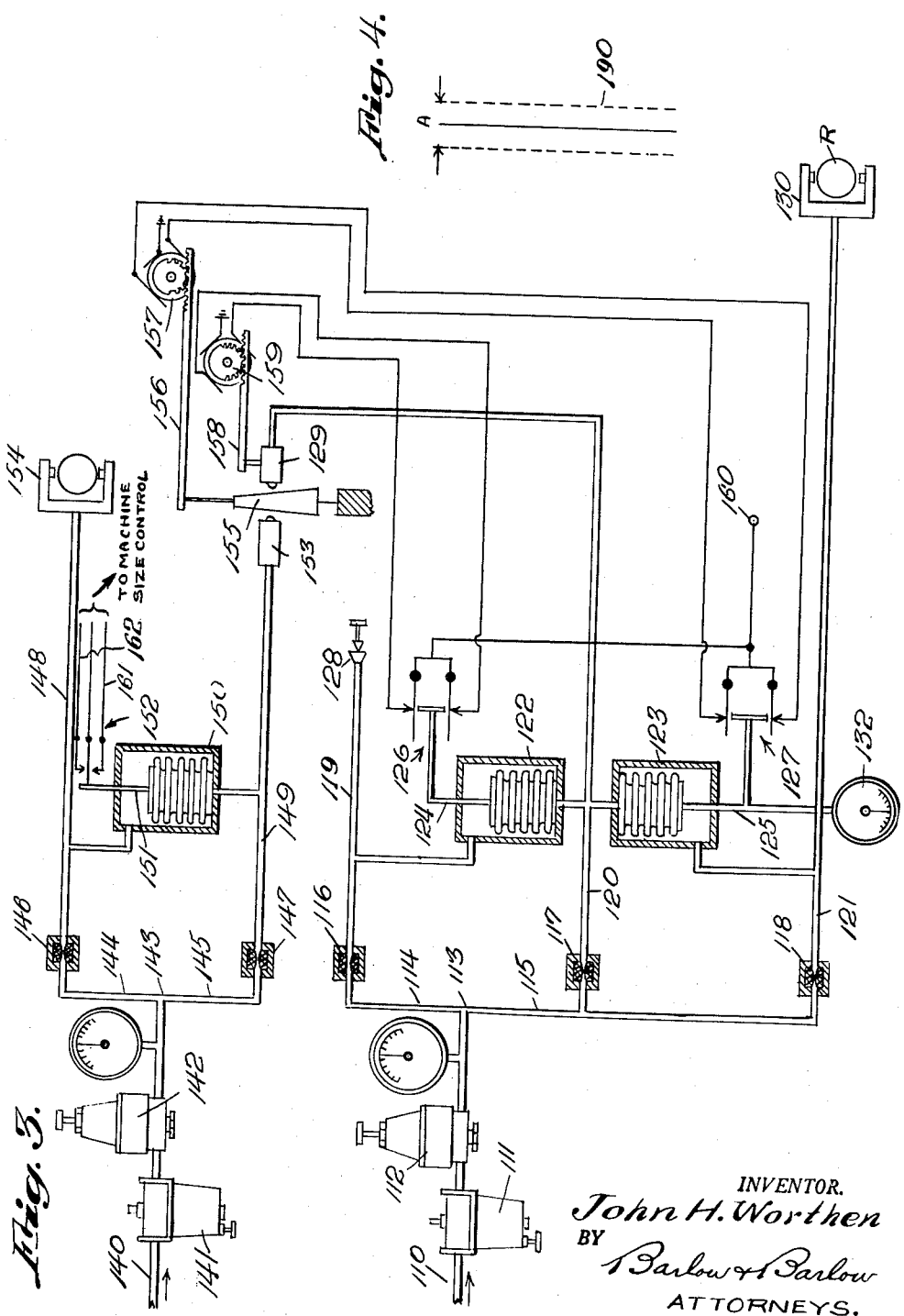

2,866,365

DRIFT GAGE MACHINE CONTROL

John H. Worthen, Warwick Neck, R. I., assignor to Federal Products Corporation, a corporation of Rhode Island Application March 2, 1956, Serial No. 569,101

7 Claims. (Cl. 77—3)

This invention relates to means for gaging the sizes of articles that are being machined and means for applying this measurement to a tool that is effecting the operation on the article to correct for any drift that may be encountered in the machining process.

Measurement means utilizing air as the fluid are commonly employed for gaging processes. For example, a gaging plug of a known diameter may be inserted into a bore and air from a determined pressure source passed into the bore by means of orifices in the plug. The amount of air flow that occurs out of this orifice is dependent upon the leakage of air between the plug and the side of the bore, which provides an indication of the size of this bore.

In accordance with the present invention fluid from a pressure source is adapted to be fed through a duct system, each branch of which includes a calibrated orifice or constricted portion and which branches lead to other orifices that act either as standards or as gaging means. There will thus result between the branches a possible pressure differential should the condition adjacent one of the orifices be changed from its zero or datum indication. A pressure differential device may then be inserted between these branches and provide a visible indication of the pressure differential existing therebetween, and additionally, electric switches may be attached to the pressure differential indicating device which will control external circuits in a manner to automatically correct for any indicated size differential over a predetermined amount, as will be more fully described. In carrying out one form of the invention, two branches are provided, one of the branches ending in a calibrated restricting orifice, and the other branch being selectively switched between calibrated orifices and test orifices, each of these orifices preferably discharging to a common back pressure, being conveniently open to the atmosphere to accomplish this result. In a second form of the invention I provide five branches, utilizing one branch as a drift indication or measuring gage, the second branch as a tool positioning gage, a third branch as a standard size gage, and a fourth and fifth branch as a differential positioning gage system.

In the drawings:

Figure 1 is a diagrammatic view of one form of the invention;

Figure 2 is a chart illustrating the operation of Figure 1;

Figure 3 is a diagrammatic view of a second form of the invention;

Figure 4 is a chart illustrating the operation of Figure 3.

Referring now to the drawing, the duct 10 from a source (not shown) of air or other fluid under pressure passes through a filter 11 and pressure regulator 12. At the T joint 13 the fluid under pressure bifurcates into the ducts 14 and 15, respectively, and thence through equalizing or isolating orifices 16, 17 to branch ducts 18, 19, respectively. Connected ahead of the equalizing orifices 16 and 17 is a master pressure gage 20. Between the branches 18 and 19 there are connected two differential pressure meters 21 and 22, which are illustrated as a closed casing having two openings therein between which a flexible diaphragm, shown in the form of bellows, is interposed. A stem 25 extends from the bellows of the meter 21 and connects to an indicating movement 27 and through a coupling means, shown as a rod 28, to a single pole, double throw switch indicated generally 29. Similarly an operating rod 26 is coupled to the bellows of the differential pressure meter 22 and connects through an operating rod 31 to a single pole, double throw switch indicated generally 32. The branch duct 19 terminates in a zero adjusting valve 33, while the branch 18 is trifurcated as at 34 to ducts 35, 36, and 37. The duct 35 is connected to a measuring head 38 which is provided with outlet orifices 39, the duct 35 having interposed therein a solenoid valve 40 with an armature 41 and operating coil 42. Branch 36 terminates in a tool positioning gage 43 which is provided with one or two air outlet orifices 44. Interposed between the tool positioning gage 43 in the branch 36 is a solenoid valve 45 provided with an operating armature 46 and operating coil 47. Branch 37 terminates in a master reference adjustable restriction orifice 48 and has interposed in its line a solenoid valve 49 having an armature 50 and operating coil 51.

Associated with this air system is an electrical control system which is under actuation of the switches 29 and 32 to provide a certain measuring cycle and operate the solenoid valves 40, 45, and 50. As an example of one method of cycling, I provide a motor 60, the shaft of which has mounted thereon a plurality of cams 61 through 69, inclusive, each of these cams having associated therewith a single pole, single throw switch 61' through 69', inclusive. To operate the cycling motor 60 and the various other electrical devices associated with this mechanism, there is provided a source of electrical energy as represented by terminals 72, 72'. For simplicity's sake, one of the terminals 72' is shown as grounded and is intended to indicate only a common return. Power is fed over conductor 73 via branch 74 to the control machine disabling switch 69', via branch 75 to one contact of the pressure sensitive switch 29, via branch 76 to one contact of pressure sensitive switch 32, via branch 77 to the solenoid switches 62', 63', and 64', and via branch 78 to holding switch 61'. Contacts 79, 79' of the single pole, double throw switch 29 are connected together and are also connected via lead 80 to one terminal of the cam motor 60. It will be noted that line 80 has a branch 80' which places normally open switch 61' in parallel with the contact 79 of switch 29, the switch 61' serving as a holding switch after the operation of motor 60 has once been initiated. Pressure switch 32 is provided with two contacts 86, 87 which are connected, respectively, via leads 88 and 89 to one contact of switches 65', 68', and 66', 67', respectively. The other contact of switch 67' is connected to lead 83, while the other contact of switch 68' is connected to lead 84 and thence to the terminals of reversible motor 85. The other contacts of switches 65', 66', on the other hand, are connected via leads 90, 91, respectively, to two contacts of reversible motor 92. The other contact of switches 62', 63', and 64' are connected via leads 93, 94, 95, respectively, to one side of the solenoid coils 42, 47, and 51, respectively, the circuit across these solenoid coils being completed to ground or a common terminal. In order now to appreciate how these various circuits are interconnected and control one another, the operation of the device will now be described.

For the sake of discussion, let us assume that the drift gauge is controlling a machine which is boring a hole by means of a single point boring tool that is adjustable and which is under control through the mechanism which is to be described.

With master ring R in place, solenoid valves 40 and 45 are opened by virtue of switches 62', 63' being closed. This, therefore, leaves connected to the branch 18 jets 39 and 44. The reading on the pressure differential indicator is noted. Additionally, in this position the air switches 29 and 32 are adjusted by means of switch adjusting screws (not shown) so that the contacts will close at a predetermined pressure differential reading from the reading noted. The increments that these adjustments assume are represented by lines 90, 90' (Figure 2) which are the point of closing of the switch 29 and lines 91 which are the point of opening of switch 32. These adjustments can most readily be done by paralleling the switch contacts 29 and 32 with indicator lights which have been eliminated from the drawing for clarity purposes and the use of orifice 33 as a variable. After these adjustments have been made, valve 40 is closed and valve 49 is opened so that master reference valve 48 may be adjusted to produce on the dial indicator 27 a reading that is the same as observed above. Orifice 48 now "looks like" master ring R. Valve 49 is now closed and valve 45 opened, and the gauge 43 is manually adjusted to obtain the reading observed above. The machine is now ready for operation, and the first piece is bored.

After the boring operation, the plug 38 is inserted into the boring either automatically or by hand for a measurement. If the boring is correct, the machine will continue to produce without any corrective action, being initiated by the control mechanism shown in the drawings. However, if the piece does not measure correctly, the switch 29 will make contact in either a plus or minus direction. Either switch 79 or 79' is thus closed, completing an electrical circuit to motor 60 which initiates a one revolution cam cycle. As soon as the cam shaft has rotated, switch 61' will close, which in effect parallels switches 79 and 79' and insures continued operation of the cam shaft until one revolution is complete whereupon it will open and stop motor 60. At the same time that switch 61' is closing, switch 69' is opening to cut off the power to the controlled machine. The power is cut off until the cam shaft again returns to its zero position. The remaining cams operate the switches to provide the following cycle: Assuming that the first sector of the cam cycling takes place by the operation of the switches 61' and 69', the second sector of operation will close normally open switch 63', which in turn opens solenoid valve 45; additionally switch 64' opens, thereby closing solenoid valve 49; and switch 62' stays closed, thereby leaving solenoid valve 40 open. It will therefore be seen that we now have connected to the branch 18 measuring jets 44 and 39. To rebalance the system, it is necessary that the tool T be moved in or out the required amount until the switch contacts of switch 32 are opened at line 91 (Figure 2). It will be noted that the tool is positioned by the rotation of motor 85. This motor is actuated through switches 68' or 67'. The choice of which of these switches (68', 67') current flows is, of course, determined by the direction in which switch 32 is closed. In any event, it must be recognized that during the second sector of cam rotation, cams 67 and 68 have closed their respective switches. With the motor under the control of switch 32, it will insure that the tool T is moved to the line 91 within the zone Y as shown in Figure 2. In actual practice, there is some inertia to the system so that the tool will actually be moved to the center line of Figure 2, which is a representation of the desired size pressure.

With the foregoing operations accomplished, we shall now move on to the third sector of cam control, in which position switch 61' is closed; switch 62' is open, thus leaving closed valve 40; switch 63' is closed, thus leaving open valve 45; and switch 64' is closed, thus leaving valve 49 open. Additionally, switch 69' is open, and switches 65' and 66' are closed. It will be noted that in this sector the master reference valve 48 is in circuit with the tool jets 43. In effect, the master valve 48 acts as a fixed reference and under the control of switch 32 the tool jets 44 will be moved an amount to establish them to their original spacing from the tool T, the circuit being established through switch 32 and either switch 65' or 66'.

The cam shaft now moves on to its fourth sector which in effect is the at rest position, and switch 61' opens and switch 69' closes. The second piece is now ready to be bored, after which operation the measuring head 38 will be inserted in this boring to check its size. If the size is correct, or in effect does not exceed the tolerance lines X shown in Figure 2, no further changes will be made. However, if it does exceed such a tolerance, the switch 29 will be actuated and the cycle as described above will be completed.

An important feature of this mechanism is the fact that the control mechanism will not only maintain the tool within the proper tolerance zone X, which is shown in Figure 2, but will also move the tool to reproduce the next piece at the desired size; that is, the machine attempts to control the boring tool in a manner to return the tool to the so-called desired size. The relationship between the various switch points on switches 29 and 32 is illustrated particularly in Figure 2. The band X represents the contact setting on switch 29, line 90 representing the switch 32 point for an under size hole and the line 90' representing the switch position for an over size hole. The tolerance band X, of course, indicates the maximum tolerance allowed in the production of the part in question and may be of a magnitude of $5 \times 10^{-4}$ inches while the band Y represents the opening of switch 32 to take care of the inertia previously mentioned and may be of a magnitude of $20 \times 10^{-6}$ inches.

For a brief review of the pneumatic measuring functions accomplished by this machine in the cycle previously described, let us assume that in the at rest position with the valves 40 and 49 open and the master ring R in place, we have adjusted the master reference valve 48 to "look like" master ring R and thus allow the same escape of air as plug 38 would produce with master ring R in place, as described above. From a pressure standpoint this might mean that in branch 19 we have a pressure of twenty-five pounds and in branch 18 we have a pressure of twenty-two pounds, there being a pressure of twenty-two pounds likewise reproduced in branches 37 and 35. Now when the master ring R is replaced by the piece that is being measured, the pressure may either remain at twenty-two pounds if the piece is of the correct size or may change from that. Let us assume that the piece is over size, which will in effect lower the pressure in leg 18, say to 21.9 pounds. This will actuate the switches 29 and 32, since it is a pressure variation that represents a dimension outside the tolerance band X (Figure 2). This actuates motor 60 and cycles the cams so that valves 40 and 45 are open. It is therefore desired to raise the pressure in leg 18 to again twenty-two pounds, and this is accomplished by moving the tool T under the influence of motor 85 so that the pressure in branch 36 is increased the required one-tenth of a pound. Now in the next sector of cam operation, valve 40 is closed and valves 45 and 49 are open. In this position we are attempting to re-relate the pressure developed in line 36 to the fixed reference, which is accomplished through the rotation of motor 92, moving the tool jets 44 the required amount to re-relate the system to a twenty-two pound reference. In brief summary, therefore, upon the first sector cycle we note that the dial 27 which indicates the differential in leg 18 over leg 19 reads the amount that leg 35 is off. This is corrected by the movement of the tool under influence of motor 85. The system, therefore, is then rebalanced with the tool jets 44 being moved to again establish the original condition and "look like" master restrictor 48. Basically, with such a system what is accomplished is to correct for the variation in tool position that might occur through either temperature variation or the wearing or the set-up of the boring tool. It should here be pointed out that the band X must be set so that it is greater than the normal piece-to-piece variation of the machine, for if it were attempted to correct the tool to the size desired location on each operation without a wide tolerance zone such as X, it would soon be found that wide excursions of plus and minus sizes would occur over the desired size.

Referring now to Figure 3, I have shown therein a modification of the measuring and drift control device which will "watch" a piece being machined and in which I utilize a plurality of legs and to do away with the switching as shown in the previous embodiment. Basically, I have shown in Figure 3 three measuring legs, one which senses a degree of error, one which measures the correction, and one which balances out. In the drawing, the system is supplied from a source (not shown) of air or other fluid under pressure through a duct 110 to a filter 111 and a pressure regulator 112. At a T joint 113 the fluid under pressure bifurcates into ducts 114 and 115, respectively, and thence through equalizing and isolating orifices 116, 117, and 118 to branch ducts 119, 120, and 121, respectively. Connected between the branches 119 and 120 is a differential pressure device 122, while connected between branches 120 and 121 is a second differential pressure device 123. Both of these devices, which are illustrated as a closed casing having two openings therein, include a flexible diaphragm shown in the form of a bellows which is interposed between these two openings. A stem 124 extends from the bellows of the device 122, while a stem 125 extends from the bellows device 123 which connects to an indicating device 132. Stem 124 operates a single pole double throw center-off switch 126, while stem 125 operates a similar switch 127. Each of these branch ducts 119, 120, and 121 are terminated, duct 119 being terminated by a zero adjust valve 128 and ducts 120 and 121, respectively, terminating in air gauging heads 129 and 130, respectively. Related through parts to be described is a second differential duct system which is shown as having a supply duct 140 from a source of fluid under pressure which may be the same source as feeds duct 110. From this input duct 140 the air or other fluid will pass through a filter 141 and a pressure regulator 142. The output of this pressure regulator 142 feeds a T joint 143 which bifurcates the air into branch ducts 144 and 145, respectively. Branch 144 feeds an equalizing and isolating orifice 146, the output of which is connected to a branch duct 148, while the branch 145 feeds an equalizing and isolating orifice 147, the output of which feeds a branch duct 149. Connected between the branches 148 and 149 is a differential pressure gauge 150 which is shown as a closed casing having two inlets thereto separated by a flexible diaphragm shown in the form of a bellows. A stem 151 extends from this bellows and connects to a single pole double throw center-off switch 152. Ducts 148 and 149 terminate in air measuring heads 154 and 153, respectively. Of the air gauges described above, the gauge 130 may be a guage ring which will be utilized to encircle the work being machined or which will be used for a set-up by having the master plug placed therein similar to the ring as heretofore described in connection with the previous embodiment. Air gauge 154 measures continuously the size of the work, while air gauges 153 and 129 are mounted on either side of a differential plate 155 that is connected through a suitable linkage 156 to a motor 157. Air gauge 153 will be fixed relative to a standard reference position, while gauge 129 will be connected through a linkage 158 to a motor 159 and thereby moved by said motor. In order to understand how these various parts are inter-related, the electric circuitry and operation will now be described.

Switches 126, 127, and 152 are basically single pole double throw center-off switches which are under the actuation of the three pressure differential devices. Power is supplied at terminal 160 to the movable pole of switches 126 and 127, and the two contacts of each of these switches are connected, respectively, to terminals on motors 159 and 157. Each of these motors is of the reversing type, and therefore, depending upon which contact is closed on each of these switches, the motors will turn in the desired direction. It will also be noted that there is provided a size control circuit for the machine under control represented by a single pole double throw center-off switch 152 which is actuated by the stem 151 of the pressure differential device 150. This switch 152 has two leads 161, 162 that actuate the control elements of the machine as will hereinafter appear.

For the sake of discussion, let us assume that the branch 119 has a pressure of twenty-four pounds in it, branch 120 has a pressure of twenty-three pounds, and the branch 121 has a pressure of twenty-one pounds. These would be normal pressures which would not actuate any of the differential pressure measuring devices or their associated switches and which would be the proper pressures when a master plug R was placed in position between the measuring head 130. This would place the differential plate 155 in a finite position, and let us assume that we have in the branches 148 and 149 pressures of twenty-one and twenty-two pounds, respectively. After the machine has gone through a cycle of operation, the work piece W will be transferred to the measuring head 130. Let us assume that the piece is under-size. If this is the case, the pressure in line 121 would drop from its normal twenty-one pounds to, let us say, a pressure of 20.9 pounds. Pressure differential device 123 senses this unbalance as it is outside the tolerance zone A (Figure 4) and actuates switch 127 in the proper direction to move the plate 155, in the example given, to the left as viewed in the drawing. This operation will change the pressure in line 120 to a pressure of 22.9 pounds, thus giving the same pressure differential between lines 120 and 121 that existed before. This change, of course, changes the pressure differential between lines 119 and 120 that is sensed in the pressure differential device 122. This device in turn actuates the switch 126, and the switch 126 actuates in the proper direction to activate the motor 159 and move the jets 129 to the left as viewed in the drawing to restore the initial pressure in line 120 of 23.0 pounds. Of course, this operation which has moved the differential plate 155 upsets the balance between the lines 148 and 149. It will be apparent that upon the movement of plate 155 to the left, there will be an increase in pressure in the line 149 from the example given of twenty-two pounds to, let us say, 22.1 pounds.

This differential will be sensed by device 150 which will complete a circuit between the common line of switch 152 and lead 162. The information thus transmitted may control the operation of the machine by acting as a stop device for the machine when the contacts again open, which may be represented by line 190 of Figure 4. To understand how this comes about, it should first be pointed out that as soon as the gauging has taken place, the machine under control begins production of the next piece. Gauge head 154 is constanly supervising this operation, and thus as soon as switch contacts 152 open, there will be present in line 148 a pressure of 21.1 pounds, which will result in the same pressure differential between lines 148 and 149 as initially established. In order to produce a greater pressure in line 148, it will be apparaent that the piece must be increased in size by the amount that the previous piece exceeded the limits set in switch 127. It will therefore be apparent that information from measuring head 130 is automatically transferred to device 150 which is directly controlling the size of the work piece.

It will be apparent, therefore, that the sequence of operations discussed above are similar to that obtained in the first embodiment. This fact is particularly apparent when it is considered that the branch 36 is equivalent to branch 120, branch 37 is equivalent to branch 119, and that branch 35 is equivalent to branch 121. Certain modifications may suggest themeselves. For instance, the mechanism of Figure 3 minus the branches 148 and 149 will become an equivalent of the system of Figure 1 if the differential plate 155 becomes the tool T. Substantial mechanism will be eliminated with such a modification. Conversely, if the tool T of Figure 1 becomes the plate 155 of Figure 3 and legs 148, 149 and the associated parts are added, the results of the system of Figure 3 will be accomplished by modified Figure 1.

I claim:

1. A drift gage control comprising a source of air pressure, three branches leading from said source, each branch having an equalizer to secure isolation from said source, a first pressure differential measuring means between the first and second branches, a second pressure differential measuring means between the second and third branches, the first branch having a reference orifice, the second branch having a movable differential reference orifice, and the third branch having a test orifice, each pressure differential means having a switch coupled thereto, a movable plate mounted adjacent said differential orifice, the switch associated with said first pressure differential measuring means actuating means to move said differential orifice, the switch associated with said second pressure differential measuring means actuating means to move said plate which will correct for drift.

2. A drift gage control comprising a source of air pressure, at least two branches leading from said source, each branch having an isolating orifice adjacent said source, one branch terminating in a test orifice, the other branch terminating in a reference orifice, at least two pressure differential measuring means between said branches, each means having an electric switch connected thereto, tool reset means, the contacts of one of the switches being arranged so that one switch operates over a greater pressure differential than the other, the switch operating over the largest differential actuating control means to effect a re-establishment of a preset pressure differential in said branches, the switch operating over the smallest differential actuating tool reset means which will correct for the drift.

3. A drift gage control as defined in claim 2 wherein the control means includes a sequential switch device and wherein there is interposed in the test branch a transfer switch device and branches leading therefrom to a second reference orifice and tool position orifice, said sequential control operating said transfer switch to measure differentials on each branch and operate selected switches to reposition a tool.

4. A drift gage control comprising a material removing means, a source of air pressure, at least two branches leading from said source, each branch having an equalizer therein to secure isolation from said source, means to measure the pressure differential between said branches, one of said branches having a test orifice adapted to engage the piece to be measured, said pressure measuring means having a switch coupled thereto, a reference orifice adapted to be coupled to the other branch, said switch closing a circuit to external means associated with at least one of said orifices for securing a variable discharge thereof to effect re-establishment of a preset pressure differential between said reference orifice and test orifice branch, a transfer valve arrangement located in the branch having the test orifice, said transfer valve having branches leading to a second reference orifice and a material removing means orifice, and means responsive to the initial unbalance to control said material removing means.

5. A drift gage control comprising a material removing means, a source of air pressure, at least two branches leading from said source, each branch having an equalizer therein to secure isolation from said source, means to measure the pressure differential between said branches, one of said branches having a test orifice adapted to engage the piece to be measured, said pressure measuring means having a switch coupled thereto, a reference orifice adapted to be coupled to the other branch, said switch closing a circuit to external means associated with at least one of said orifices for securing a variable discharge thereof to effect re-establishment of a preset pressure differential between said reference orifice and test orifice branch, a third branch having an adjustable orifice at its end, and a second pressure differential measuring means between said third branch and said reference orifice branch, said second pressure differential measuring means having a switch coupled thereto that controls means to establish a new reference between said reference orifice branch and third branch, and means responsive to the initial unbalance to control said material removing means.

6. A pneumatic gaging and material removing machine control comprising a tool positioning means having a tool coupled thereto, a source of air pressure, at least two branches leading from said source, each branch having an equalizer therein to secure isolation from said source, means to measure the pressure differential between said branches, one of said branches having a test orifice adapted to engage the piece to be measured, said pressure differential measuring means having control means coupled thereto which is responsive at a pressure that represents a certain amount of oversize or undersize, said control means actuating a tool positioning means to move the tool a distance equivalent to the amount the measured piece exceeds the certain amount of undersize or oversize and a third measuring branch associated with the tool positioning means, said third branch sensing the tool position and means re-establishing a preset pressure in said branch after the tool has been positioned.

7. A pneumatic gaging and material removing machine control comprising a tool positioning means having a tool coupled thereto, a source of air pressure, at least two branches leading from said source, each branch having an equalizer therein to secure isolation from said source, means to measure the pressure differential between said branches, one of said branches having a test orifice adapted to engage the piece to be measured, said pressure differential measuring means having control means coupled thereto which is responsive only outside of a tolerance band on either side of a desired piece size, said control means actuating a tool positioning means to move the tool a distance equivalent to the amount the measured piece exceeds the tolerance band limits and a third measuring branch associated with the tool positioning means, said third branch sensing the tool position and means re-establishing a preset pressure in said branch after the tool has been positioned.

References Cited in the file of this patent

UNITED STATES PATENTS

| | | |
|---|---|---|
| 2,270,406 | Blood | Jan. 20, 1942 |
| 2,564,527 | Fortier | Aug. 14, 1951 |
| 2,585,533 | Bryant et al. | Feb. 12, 1952 |
| 2,665,579 | Fortier | Jan. 12, 1954 |
| 2,795,855 | Worthen | June 18, 1957 |